United States Patent
Suzuki et al.

(10) Patent No.: US 9,341,857 B2
(45) Date of Patent: May 17, 2016

(54) IMAGING LENS COMPRISING A DIFFRACTIVE OPTICAL SURFACE

(71) Applicant: KANTATSU CO., LTD., Yaita-shi, Tochigi (JP)

(72) Inventors: Hisanori Suzuki, Sukagawa (JP); Yukio Sekine, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 125 days.

(21) Appl. No.: 13/898,120

(22) Filed: May 20, 2013

(65) Prior Publication Data

US 2013/0321920 A1     Dec. 5, 2013

(30) Foreign Application Priority Data

May 30, 2012 (JP) ................. 2012-123474

(51) Int. Cl.
| | | |
|---|---|---|
| G02B 13/18 | (2006.01) | |
| G02B 3/02 | (2006.01) | |
| G02B 9/34 | (2006.01) | |
| G02B 27/44 | (2006.01) | |

(Continued)

(52) U.S. Cl.
CPC ............. *G02B 27/42* (2013.01); *G02B 13/004* (2013.01); *G02B 27/0037* (2013.01); *G02B 9/34* (2013.01); *G02B 13/04* (2013.01); *G02B 13/18* (2013.01)

(58) Field of Classification Search
CPC ...... G02B 13/004; G02B 13/04; G02B 13/18; G02B 9/34; G02B 27/0037; G02B 27/42
USPC ................................................. 359/715, 780
See application file for complete search history.

(56) References Cited

U.S. PATENT DOCUMENTS

| | | | | |
|---|---|---|---|---|
| 5,044,706 A | * | 9/1991 | Chen ................... | G02B 5/1876 359/356 |
| 5,581,405 A | * | 12/1996 | Meyers ................ | G02B 5/1876 359/569 |

(Continued)

FOREIGN PATENT DOCUMENTS

| | | |
|---|---|---|
| CN | 202049278 U | 11/2011 |
| CN | 202171677 U | 3/2012 |

(Continued)

OTHER PUBLICATIONS

Office Action dated Mar. 1, 2016, issued in counterpart Japanese Patent Application No. 2012-123474, with English translation (10 pages).

*Primary Examiner* — Thomas K Pham
*Assistant Examiner* — Nicholas R Pasko
(74) *Attorney, Agent, or Firm* — Westerman, Hattori, Daniels & Adrian, LLP

(57) ABSTRACT

An imaging lens includes, from the object side to the image side, an aperture stop, a first lens with positive refractive power having a convex object-side surface near an optical axis, a second lens with positive refractive power having a convex image-side surface near the axis, a third lens with positive refractive power having a convex image-side surface near the axis, and a fourth lens with negative refractive power having a concave image-side surface near the axis, wherein all lens surfaces are aspheric, all lenses are made of plastic material, a diffractive optical surface is formed on at least one of the lens surfaces from the first lens image-side surface to the second lens image-side surface, and at least one of the three positive lenses satisfies 1.58<Ndi where Ndi is the refractive index of the i-th positive lens at the d-ray.

8 Claims, 12 Drawing Sheets

(51) Int. Cl.
    *G02B 5/18*           (2006.01)
    *G02B 27/42*        (2006.01)
    *G02B 13/00*        (2006.01)
    *G02B 27/00*        (2006.01)
    *G02B 13/04*        (2006.01)

(56) References Cited

U.S. PATENT DOCUMENTS

| | | | | |
|---|---|---|---|---|
| 6,900,948 | B2 * | 5/2005 | Sato | G02B 13/004 359/715 |
| 6,950,246 | B2 * | 9/2005 | Amanai | G02B 9/34 359/771 |
| 7,433,135 | B2 * | 10/2008 | Sun | G02B 9/34 359/569 |
| 7,446,954 | B2 * | 11/2008 | Sun | G02B 9/34 359/569 |
| 7,826,149 | B2 | 11/2010 | Tang et al. | |
| 7,944,627 | B2 * | 5/2011 | Sakagami | G02B 13/004 359/570 |
| 8,068,290 | B1 * | 11/2011 | Tsai | G02B 13/004 359/715 |
| 8,320,061 | B2 * | 11/2012 | Ko | G02B 13/004 359/715 |
| 8,422,151 | B2 * | 4/2013 | Lai | G02B 9/34 359/715 |
| 8,817,390 | B2 * | 8/2014 | Hashimoto | G02B 9/34 359/715 |
| 8,896,937 | B1 * | 11/2014 | Hsueh | G02B 13/004 359/715 |
| 8,953,263 | B2 * | 2/2015 | Baba | G02B 13/004 359/715 |
| 2010/0309367 | A1 * | 12/2010 | Iba | G02B 9/34 348/345 |
| 2012/0236421 | A1 * | 9/2012 | Tsai | G02B 13/004 359/780 |
| 2014/0036133 | A1 * | 2/2014 | Sekine | G02B 15/14 348/340 |

FOREIGN PATENT DOCUMENTS

| | | |
|---|---|---|
| JP | 2004-341512 A | 12/2004 |
| JP | 2010-60834 A | 3/2010 |
| JP | 2011-112719 A | 6/2011 |
| WO | 2011/004443 A1 | 1/2011 |

\* cited by examiner

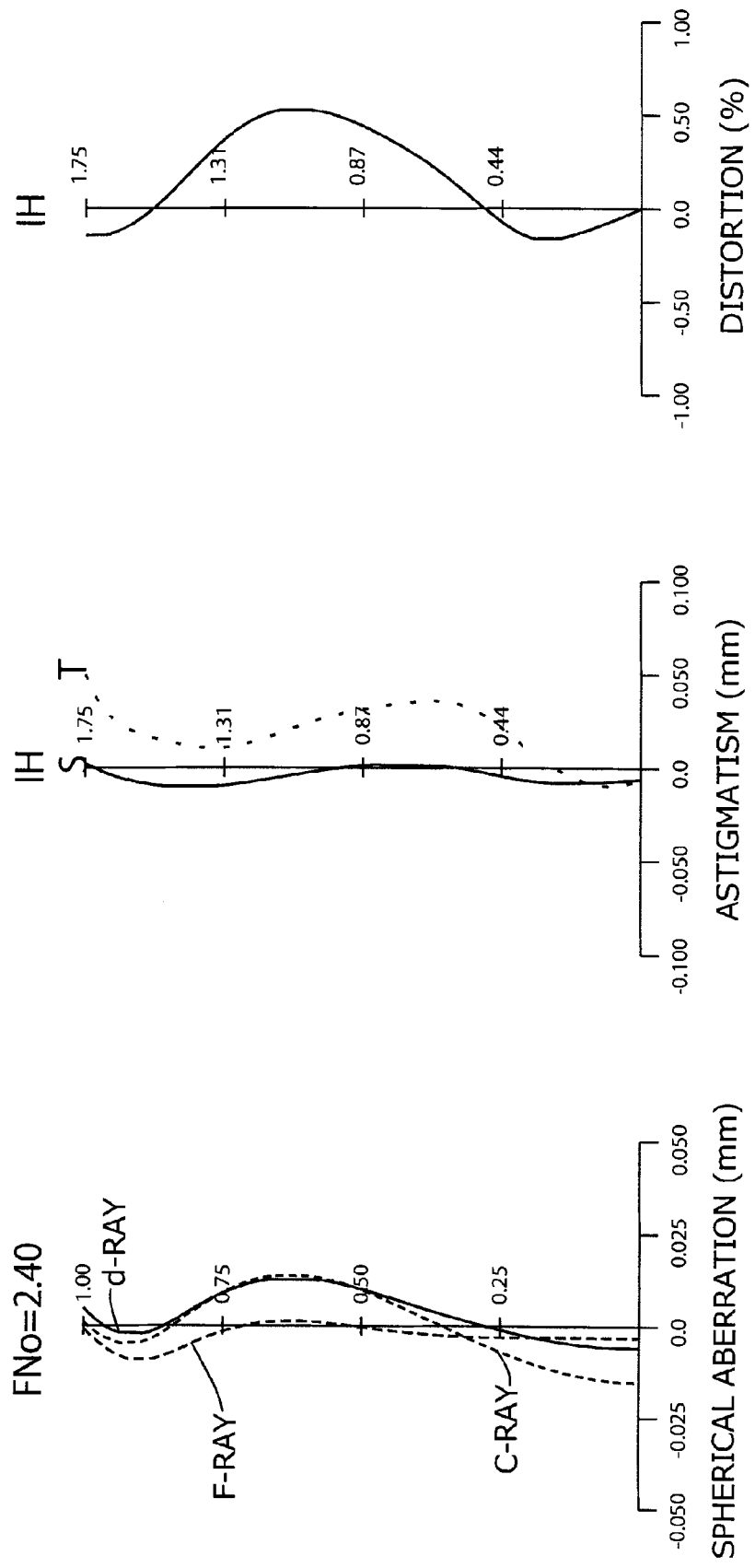

US 9,341,857 B2

IMAGING LENS COMPRISING A DIFFRACTIVE OPTICAL SURFACE

The present application is based on and claims priority of Japanese patent application No. 2012-123474 filed on May 30, 2012, the entire contents of which are hereby incorporated by reference.

BACKGROUND OF THE INVENTION

1. Field of the Invention

The present invention relates to imaging lenses which form an image of an object on a solid-state image sensor such as a CCD sensor or C-MOS sensor used in a compact image pickup device and more particularly to imaging lenses composed of four lenses which are built in image pickup devices mounted in mobile terminals such as mobile phones and smart phones, which are becoming increasingly compact and thin, and PDAs (Personal Digital Assistants), game consoles and information terminals such as PCs.

2. Description of the Related Art

In recent years, the market of mobile terminals with an image pickup device has been expanding increasingly. Today, most of such mobile terminals have a camera function. Nowadays, as for the camera performance of these mobile terminals, a high pixel-density camera function comparable to a digital still camera is becoming mainstream. Furthermore, for the reasons of convenience and appearance, the demand for thinner models is growing, leading to a stronger need for smaller and thinner built-in image pickup devices. With this background, an imaging lens built in an image pickup device using a high pixel-density image sensor is expected to provide higher resolution and be more compact and thinner and also to be a fast lens (namely lens with a small F-value). At the same time, the imaging lens is strongly anticipated to provide a wide angle of view so that an image of a wide object can be taken.

Conventionally, an imaging lens composed of two or three lenses has been widely used in a mobile phone with an image pickup device because it is advantageous in terms of size and cost. However, in order to meet the trend toward higher performance, many types of imaging lens composed of four lenses have been proposed because they can provide relatively high performance. However, although the number of pixels can be increased by increasing the number of constituent lenses, it is difficult to realize an imaging lens which meets the need for compactness and thinness.

Many conventional imaging lenses composed of four lenses which have been proposed include a positive first lens, a negative second lens, a positive third lens, and a fourth lens for aberration correction which are arranged in order from the object side. In most cases, this lens configuration uses a low-dispersion material with a large Abbe number for the first lens with positive power and a high-dispersion material with a small Abbe number for the second lens with negative power in order to correct chromatic aberration. However, the existence of a lens with negative power makes it difficult to shorten the distance in the optical axis direction, posing a problem that it is difficult to meet the need for thin imaging lenses though chromatic aberration can be corrected properly.

For example, U.S. Pat. No. 7,826,149 B2 (Patent Document 1) discloses an imaging lens including, in order from the object side, a first lens with positive refractive power having a convex object-side surface, an aperture stop, a second lens with negative refractive power as a double-sided aspheric lens, a third lens with positive refractive power as a double-sided aspheric meniscus lens having a concave object-side surface or a double-sided aspheric biconvex lens, and a fourth lens with negative refractive power as a double-sided aspheric biconcave lens, in which pole-change points are on the image-side surface of the fourth lens and the maximum ratio between the distance on the optical axis from the aperture stop to the image plane and the total track length is defined. In this imaging lens, in order to shorten the total track length, the refractive power of the first lens is increased and the object-side surface of the fourth lens is concave so that the image side principal point in the optical system is away from the image plane.

JP-A-2004-341512 (Patent Document 2) discloses an imaging lens including, in order from the object side, a positive meniscus lens having a convex object-side surface as a first lens, an aperture diaphragm, a meniscus lens having a convex image-side surface as a second lens, a positive meniscus lens having a convex image-side surface as a third lens, and a negative lens as a fourth lens, wherein at least one surface of the fourth lens is aspheric and the ratio between the power of the paraxial region of the fourth lens and the power at maximum light ray height and the difference between the third lens' Abbe number and the fourth lens' Abbe number are set within appropriate ranges respectively. In this imaging lens, the first lens is a meniscus lens whose object-side surface has a strong positive power and the image side principal point of the first lens is closer to the object and the image side surface of the fourth lens is concave so that the total track length is short.

SUMMARY OF THE INVENTION

In the imaging lens described in Patent Document 1, the ratio of total track length (TTL) to maximum image height (IH) (TTL/(2IH)) is about 0.9, so a relatively compactness is achieved. However, if further thinness is pursued using the lens power and surface combination of this imaging lens, it would be difficult for each constituent lens to have an adequate center thickness and an adequate edge thickness, posing a problem that when the constituent lenses are manufactured by injection molding, resin filling work may be difficult. It is structurally impossible to apply this imaging lens, for example, to a small image sensor of ⅕ inch or less while keeping the ratio of total track length to maximum image height low. Also in the imaging lens described in Patent Document 2, the ratio of total track thickness to maximum image height (TTL/(2IH)) is about 1.17 and the total track length is as long as about 7 mm, so satisfactory compactness is not achieved. In addition, the half angle of view is about 33 degrees, so the angle of view is not sufficiently wide.

The present invention has been made in view of the above problem and has an object to provide an imaging lens composed of four lenses which is compact and thin, has a small F-value, corrects various aberrations properly, provides a relatively wide angle of view and meets the need for cost reduction.

According to an aspect of the present invention, there is provided an imaging lens composed of four lenses which are arranged in order from an object side to an image side as follows: an aperture stop, a first lens with positive refractive power having a convex surface on the object side near an optical axis, a second lens with positive refractive power having a convex surface on the image side near the optical axis, a third lens with positive refractive power having a convex surface on the image side near the optical axis, and a fourth lens with negative refractive power having a concave surface on the image side near the optical axis. All the lenses are made of plastic material and all the lens surfaces are aspheric. A diffractive optical surface is formed on at least one of the lens surfaces from the image-side surface of the first lens to the image-side surface of the second lens, and at least one of the three lenses with positive refractive power satisfies a conditional expression (1) below:

$$1.58 < Ndi \qquad (1)$$

where

Ndi: refractive index of the i-th positive lens at d-ray.

In the imaging lens according to an aspect of the present invention, since the first, second, and third lenses have positive power, the inter-lens distance is shortened, and since the fourth lens has negative power near the optical axis, it is easy to shorten the total track length and ensure an adequate back focus. Also, all the lenses are made of plastic material, so high mass productivity and cost reduction are also achieved. Furthermore, all the lens surfaces have adequate aspheric shapes to correct various aberrations properly. A diffractive optical surface is formed on at least one of the lens surfaces from the image-side surface of the first lens to the image-side surface of the second lens. The diffractive optical surface has a relief which produces an optical path difference defined by an optical path difference function. Whereas the Abbe number of an ordinary glass material at e-ray is in the range from 25 to 80, the Abbe number of the diffractive optical surface at e-ray is about −3.3 (negative number), suggesting approximately one-digit higher dispersion. The adequately shaped diffractive optical surface makes it possible to correct chromatic aberration properly without a negative power lens with a small Abbe number and shorten the total track length.

The aperture stop is located on the object side of the first lens. Since the aperture stop is nearest to the object in the lens system, the exit pupil is remote from the image plane and the angle of light rays incident on the image sensor can be easily restrained and a good telecentricity can be obtained on the image side.

The conditional expression (1) defines an adequate refractive index range for at least one of the three lenses with positive refractive power. By using a plastic material with a relatively high refractive index, the total track length can be shortened while each constituent lens has a sufficient edge thickness.

Preferably the imaging lens according to the present invention satisfies a conditional expression (2) below:

$$0.7 < TTL/(2IH) < 0.9 \qquad (2)$$

where

TTL: distance on the optical axis from the object-side surface of the first lens to the image plane IH: maximum image height.

The conditional expression (2) defines an appropriate range of the ratio of total track length to maximum image height. If the ratio is above the upper limit in the conditional expression (2), the total track length would be long relative to the maximum image height and it would be easier to improve the performance due to the increased freedom in the shape of each lens, but it would be disadvantageous in shortening the total track length. On the other hand, if the ratio is below the lower limit in the conditional expression (2), the total track length would be too short relative to the maximum image height and it would be difficult for the constituent lenses to have a manufacturable thickness and due to the decreased freedom in the shape of each lens including an aspheric shape, it would be difficult to make a lens configuration to correct various aberrations properly.

Preferably the imaging lens according to the present invention satisfies a conditional expression (3) below:

$$0.7 < f1/f < 1.1 \qquad (3)$$

where f1: focal length of the first lens f: focal length of an overall optical system.

The conditional expression (3) defines an appropriate range of the ratio of the focal length of the first lens to the focal length of the overall optical system and represents a condition to shorten the total track length and correct aberrations properly. If the ratio is above the upper limit in the conditional expression (3), the positive power of the first lens would be relatively weak and it would be necessary to increase the positive power of the second lens or third lens in order to keep the total track length short. In that case, it would be difficult to ensure that the second or third lens has a sufficient edge thickness, posing a problem of formability. On the other hand, if the ratio is below the lower limit in the conditional expression (3), it would be difficult to ensure that the first lens has a sufficient edge thickness and unfavorably the positive power of the first lens would be too strong, leading to an increase in spherical aberration.

Preferably the imaging lens according to the present invention satisfies a conditional expression (4) below:

$$0.40 < r1/f < 1.0 \qquad (4)$$

where r1: curvature radius of the object-side surface of the first lens f: focal length of the overall optical system.

The conditional expression (4) defines an appropriate range of the ratio of the object-side surface curvature radius of the first lens to the focal length of the overall optical system. If the ratio is above the upper limit in the conditional expression (4), the positive power of the object-side surface of the first lens would be weak and in order to maintain the positive power of the first lens, its image-side surface should be strongly convex. In that case, the image side principal point of the first lens would be closer to the image plane, making it difficult to shorten the total track length. On the other hand, if the ratio is below the lower limit in the conditional expression (4), the positive power of the object-side surface of the first lens would be too strong and it would be difficult to suppress high-level spherical aberration or coma aberration and ensure a sufficient lens edge thickness, leading to poor formability.

Preferably the imaging lens according to the present invention satisfies a conditional expression (5) below:

$$0.6 < f123/f < 0.9 \qquad (5)$$

where f123: composite focal length of the first, second, and third lenses f: focal length of the overall optical system.

The conditional expression (5) defines an appropriate range of the ratio of the composite focal length of the first, second, and third lenses to the focal length of the overall optical system. If the ratio is above the upper limit in the conditional expression (5), the composite power of the first, second, and third lenses would be too weak and it would be difficult to shorten the total track length. On the other hand, if the ratio is below the lower limit in the conditional expression (5), the composite power of the first, second, and third lenses would be too strong and thus the negative power of the fourth lens should be strong. In that case, it would be difficult to correct aberration across the whole image height properly.

Preferably the fourth lens in the present invention has a pole-change point off the optical axis on its object-side and image-side surfaces. When the fourth lens has a pole-change point off the optical axis on its object-side and image-side surfaces, distortion can be corrected properly according to change in total track length and the angle of light rays incident on the image sensor can be restrained. "Pole-change point" here means a point on an aspheric surface where a tangential plane crosses the optical axis vertically.

Preferably the imaging lens according to the present invention satisfies a conditional expression (6) below:

$$0.6 < \Sigma d/TTL < 0.8 \tag{6}$$

where $\Sigma d$: distance on the optical axis from the object-side surface of the first lens to the image-side surface of the fourth lens TTL: distance on the optical axis from the object-side surface of the first lens to the image plane.

The conditional expression (6) represents a condition to ensure an adequate back focus and prevent an increase in various aberrations. If the ratio is above the upper limit in the conditional expression (6), an adequate back focus would not be ensured, making it impossible to place an IR cut filter, etc. On the other hand, if the ratio is below the lower limit in the conditional expression (6), unfavorably the value of back focus would be too large and it would be difficult to ensure a manufacturable lens thickness and various aberrations would increase.

Preferably the imaging lens according to the present invention satisfies a conditional expression (7) below:

$$0.02 < T12/\Sigma d < 0.20 \tag{7}$$

where

T12: distance on the optical axis from the image-side surface of the first lens to the object-side surface of the second lens $\Sigma d$: distance on the optical axis from the object-side surface of the first lens to the image-side surface of the fourth lens.

The conditional expression (7) defines an appropriate range of the ratio of the distance on the optical axis from the image-side surface of the first lens to the object-side surface of the second lens to the distance on the optical axis from the object-side surface of the first lens to the image-side surface of the fourth lens. If the ratio is above the upper limit in the conditional expression (7), it would be necessary to decrease the center thicknesses of the first and second lenses, leading to poor formability of the lenses. On the other hand, if the ratio is below the lower limit in the conditional expression (7), it would be easy for the first and second lenses to have a sufficient thickness but the air distance between the first lens and second lens on the optical axis and the air distance between them in the edge areas would be too small and the first and second lenses might contact each other after they are assembled.

Preferably in the imaging lens according to the present invention, the first lens, the second lens, the third lens, and the fourth lens satisfy a conditional expression (8) below:

$$0.6 < Tie/Ti < 1.3 \tag{8}$$

where

Ti: center thickness of the i-th lens

Tie: edge thickness of the i-th lens.

The conditional expression (8) defines an appropriate range of the ratio of the edge thickness of each lens to the center thickness of the lens. In consideration of the fluidity of the material in the formation of a plastic lens, it is desirable that the lens thickness difference from the lens center to the lens edge be as small as possible. When the ratio is within the range between the upper limit and lower limit in the conditional expression (8), it is easy to prevent molding problems such as poor fluidity and surface sinks.

Preferably the imaging lens according to the present invention satisfies a conditional expression (9) below:

$$1 \leq Dn \leq 20 \tag{9}$$

where

Dn: the number of orbicular zones of diffraction grating (integer).

The conditional expression (9) defines an appropriate range of the number of orbicular zones of a diffractive optical surface formed on at least one of the surfaces from the image-side surface of the first lens to the image-side surface of the second lens. When the number of orbicular zones is 20 or less, diffuse reflection in the edge area of each orbicular zone is suppressed and it is easy to prevent ghosts and flares which are harmful to the lens performance.

BRIEF DESCRIPTION OF THE DRAWINGS

FIG. 12 shows spherical aberration, astigmatism and distortion of the imaging lens according to the Embodiment 6.

DETAILED DESCRIPTION OF THE PREFERRED EMBODIMENTS

Figure 1:
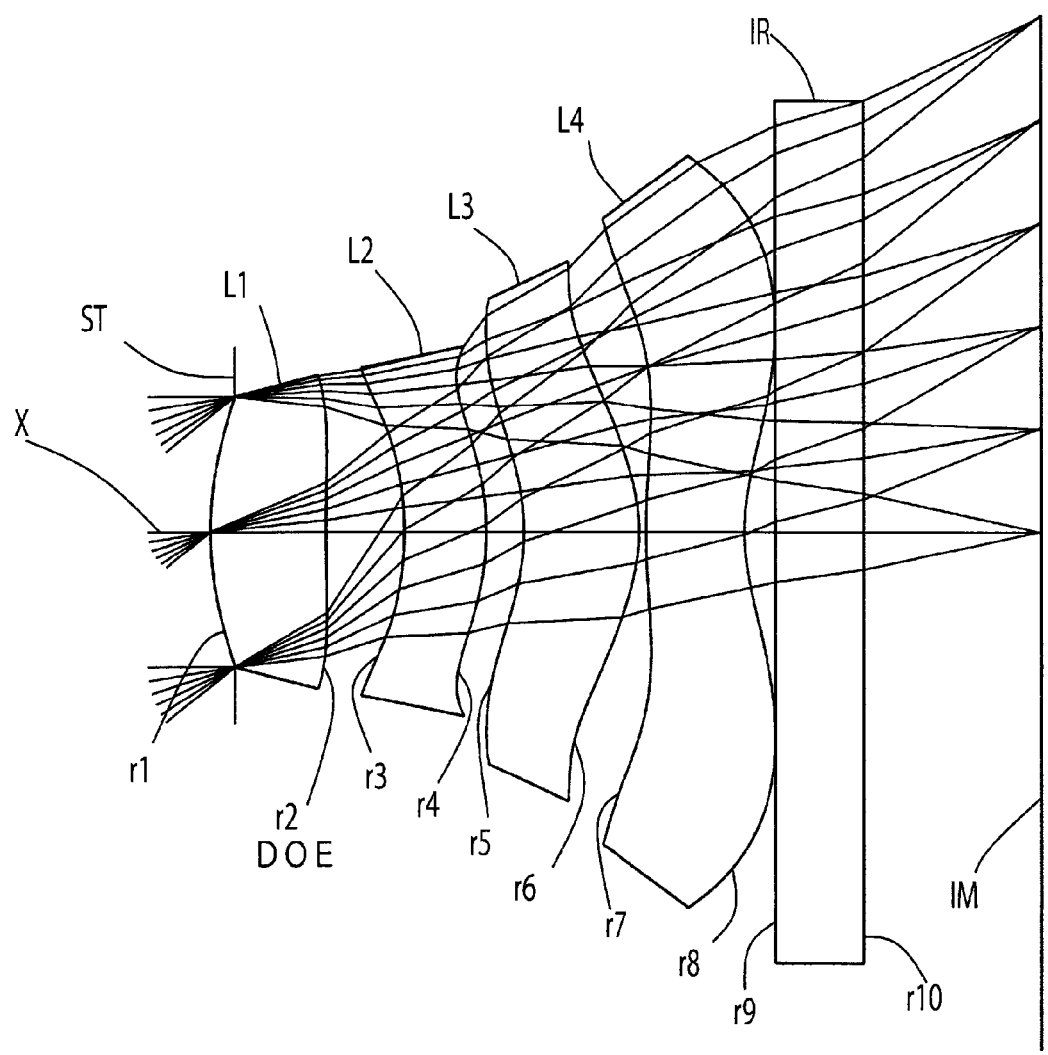
FIG. 1 is a view showing the general configuration of an imaging lens according to Embodiment 1 of the invention.

Next, the preferred embodiments of the present invention will be described in detail referring to the accompanying drawings. FIGS. 1, 3, 5, 7, 9 and 11 are views showing the general configurations of imaging lenses according to the Embodiments 1 to 6 of the present invention respectively. As shown in FIG. 1, in the imaging lens according to the Embodiment 1, lenses are arranged in the following order from the object side to the image side: aperture stop ST, meniscus first lens L1 with positive refractive power having a convex surface on the object side near optical axis X, meniscus second lens L2 with positive refractive power having a convex surface on the image side near the optical axis X, meniscus third lens L3 with positive refractive power having a convex surface on the image side near the optical axis X, and meniscus fourth lens L4 with negative refractive power having a concave surface on the image side near the optical axis X. All the lens surfaces are aspheric and diffractive optical surface DOE is formed on the image-side surface r2 of the first lens L1. The diffractive optical surface DOE may be formed on at least one of the surfaces from the image-side surface r2 of the first lens L1 to the image-side surface r4 of the second lens L2. The first lens L1 is made of polycarbonate material with a high refractive index and the second lens L2, third lens L3, and fourth lens L4 are made of low-dispersion olefin material. Filter IR is located between the fourth lens L4 and image plane IM. This filter is omissible. In calculation of a distance on the optical axis, the filter is removed.

The first lens L1 should be a lens with positive refractive power having a convex surface on the object side and for example, it may be a biconvex lens. The second lens L2 should be a lens with positive refractive power having a convex surface on the image side and for example, it may be a biconvex lens.

All the lens surfaces are aspheric and the aspheric shape of these lens surfaces is expressed by Equation 1, where Z represents an axis in the optical axis direction, H represents height perpendicular to the optical axis, k represents the conic constant, and A4, A6, A8, A10, A12, A14, and A16 represent aspheric surface coefficients. The optical path difference function of the diffractive optical surface is expressed by Equation 2.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

$$P = \sum_{i=1}^{7} B_{2i} Y^{2i}$$

Equation 2 where
P: optical path difference
$B_{2i}$: coefficient of optical path difference function (i=1 to 7)

The imaging lens according to this embodiment satisfies the following conditional expressions:

$1.58 < Ndi$ (1)

$0.7 < TTL/(2IH) < 0.9$ (2)

$0.7 \leq f1/f < 1.1$ (3)

$0.40 < r1/f < 1.0$ (4)

$0.6 < f123/f < 0.9$ (5)

$0.6 < \Sigma d/TTL < 0.8$ (6)

$0.02 < T12/\Sigma d < 0.20$ (7)

$0.6 < Tie/Ti < 1.3$ (8)

$1 \leq Dn \leq 20$ (9)

where
Ndi: refractive index of the i-th positive lens at d-ray
TTL: distance on the optical axis from the object-side surface of the first lens to the image plane
IH: maximum image height
f1: focal length of the first lens
f: focal length of the overall optical system
r1: curvature radius of the object-side surface of the first lens
f123: composite focal length of the first, second, and third lenses
Σd: distance on the optical axis from the object-side surface of the first lens to the image-side surface of the fourth lens
T12: distance on the optical axis from the image-side surface of the first lens to the object-side surface of the second lens
Ti: center thickness of the i-th lens
Tie: edge thickness of the i-th lens
Dn: the number of orbicular zones of diffraction grating (integer).

Next, the imaging lenses according to the preferred embodiments of the present invention will be explained. In each embodiment, f represents the focal length of the overall optical system of the imaging lens, FNo represents F-number, ω represents half angle of view, and IH represents maximum image height. i represents a surface number counted from the object side, r represents curvature radius, d represents the distance between lens surfaces on the optical axis (surface distance), Nd represents refractive index with respect to d-ray (reference wavelength), and vd represents Abbe number with respect to d-ray. As for aspheric surfaces, an asterisk (*) after surface number i indicates an aspheric surface and DOE represents a surface on which a diffractive optical surface is formed.

Embodiment 1

The basic lens data of Embodiment 1 is shown below in Table 1.

TABLE 1

Embodiment 1
Unit mm f = 2.176
Fno = 2.40
ω(°) = 38.81
IH = 1.75

Surface Data

| Surface No. i | Curvature Redius r | Surface distance d | Refractive Index Nd | Abbe No. vd |
|---|---|---|---|---|
| (Object Surface) | Infinity | Infinity | | |
| 1* (Stop) | 1.198 | 0.394 | 1.6142 | 25.58 |
| 2* (DOE) | 7.296 | 0.266 | | |
| 3* | −1.194 | 0.280 | 1.5346 | 56.16 |
| 4* | −0.933 | 0.128 | | |
| 5* | −0.746 | 0.394 | 1.5346 | 56.16 |
| 6* | −0.633 | 0.024 | | |
| 7* | 2.282 | 0.335 | 1.5346 | 56.16 |
| 8* | 0.722 | 0.300 | | |
| 9* | Infinity | 0.300 | 1.5168 | 64.20 |
| 10* | Infinity | 0.415 | | |
| Image plane | Infinity | | | |

Single lens data

| Lens | Start plane | Focal Length |
|---|---|---|
| 1 | 1 | 1.985 |
| 2 | 3 | 5.785 |
| 3 | 5 | 3.526 |
| 4 | 7 | −2.127 |

TABLE 1-continued

Embodiment 1
Unit mm

Aspheric data

|  | 1st Surface | 2nd Surface | 3rd Surface | 4th Surface |
|---|---|---|---|---|
| k | −3.376E+00 | −9.800E+01 | −5.653E−01 | −1.317E−01 |
| A4 | 1.634E−01 | −3.131E−01 | −9.108E−01 | −9.159E−02 |
| A6 | −7.042E−01 | −1.194E+00 | 9.538E−01 | 2.478E+00 |
| A8 | 1.577E+00 | 1.162E+00 | 9.959E+00 | 4.983E+00 |
| A10 | −6.121E+00 | −7.521E−01 | −1.705E+01 | −1.166E+01 |
| A12 | 0.000E+00 | 0.000E+00 | 0.000E+00 | 3.697E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

|  | 5th Surface | 6th Surface | 7th Surface | 8th Surface |
|---|---|---|---|---|
| k | −1.163E+00 | −4.503E+00 | 0.000E+00 | −8.430E+00 |
| A4 | 9.182E−01 | −1.771E−01 | −8.062E−01 | −4.342E−01 |
| A6 | −4.064E−01 | 8.922E−01 | 5.782E−01 | 4.474E−01 |
| A8 | 5.737E+00 | −1.768E+00 | −2.649E−01 | −4.770E−01 |
| A10 | −3.403E+01 | 1.774E+00 | 1.558E−01 | 3.795E−01 |
| A12 | 8.881E+01 | 2.771E+00 | 7.900E−02 | −2.052E−01 |
| A14 | −1.147E+02 | −6.669E+00 | −1.263E−01 | 6.211E−02 |
| A16 | 5.904E+01 | 3.339E+00 | 2.255E−02 | −8.228E−03 |

Coefficient of optical path difference function

| B1 | −3.307E−02 |
| B2 | −3.094E−02 |
| B3 | 1.915E−01 |
| B4 | −2.130E−01 |
| B5 | −4.551E+00 |
| B6 | 2.357E+01 |
| B7 | −3.572E+01 |

As shown in Table 7, the imaging lens in the Embodiment 1 satisfies all the conditional expressions (1) to (9).

Figure 2:
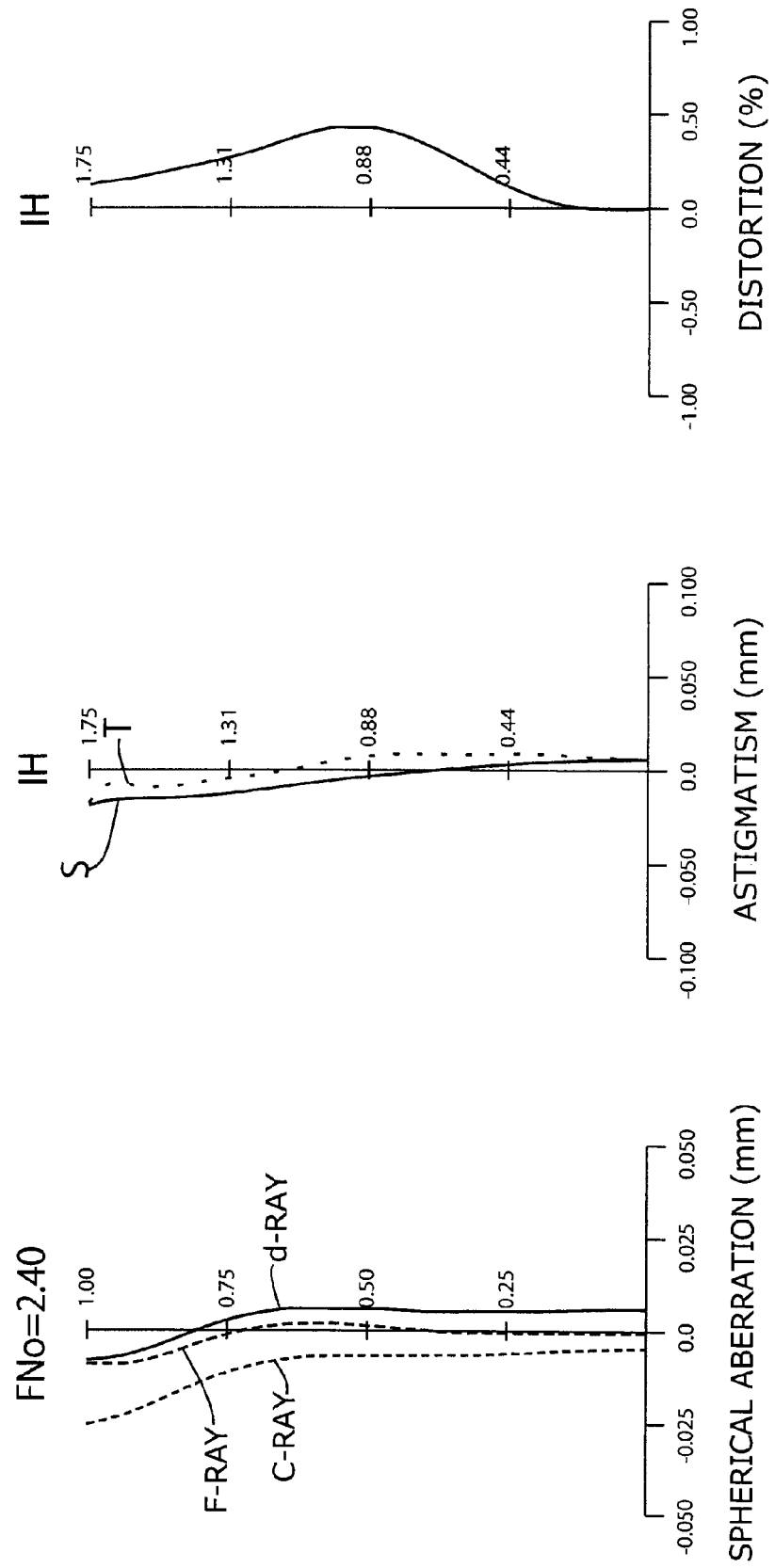
FIG. 2 shows spherical aberration, astigmatism and distortion of the imaging lens according to the Embodiment 1.
Figure 3:
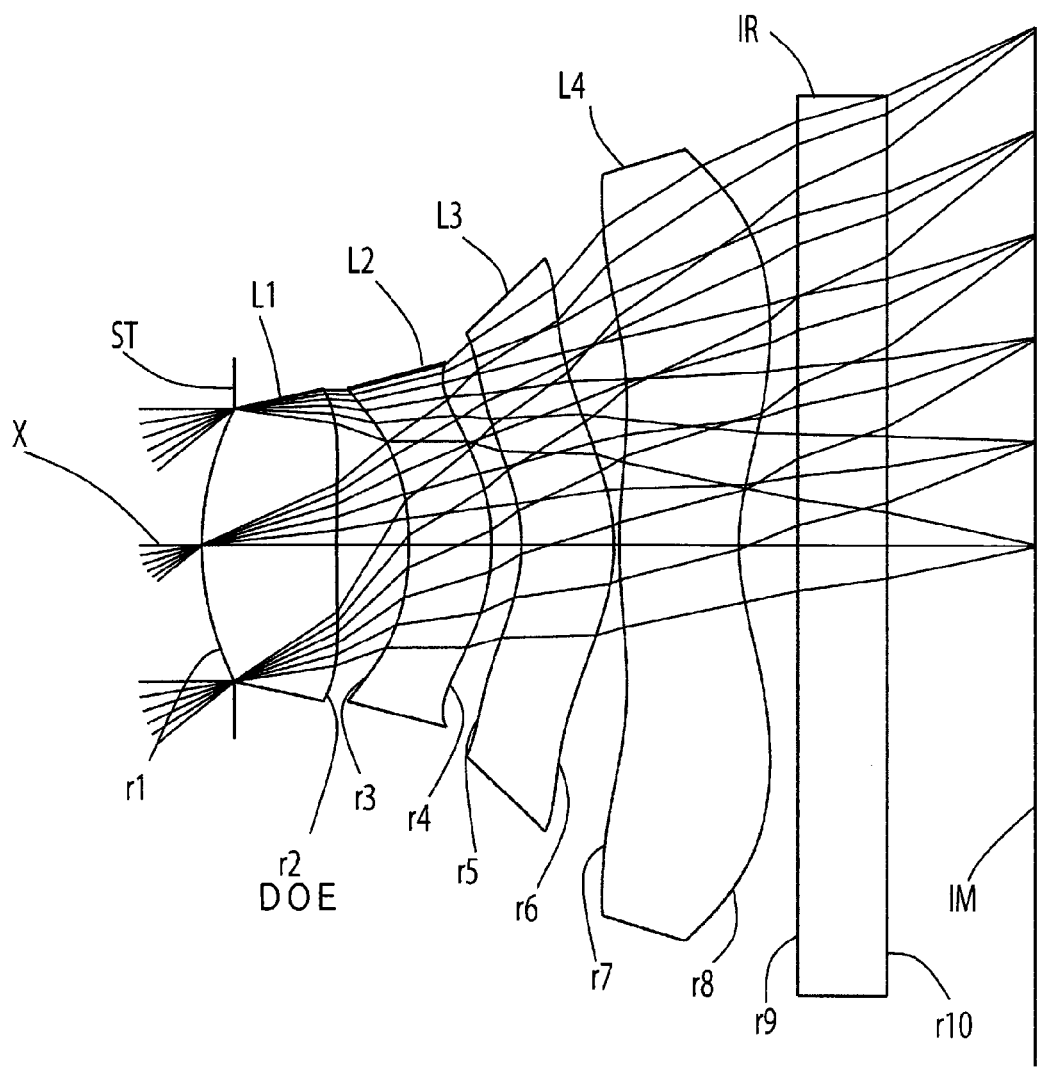
FIG. 3 is a view showing the general configuration of an imaging lens according to Embodiment 2 of the invention.

FIG. 2 shows spherical aberration (mm), astigmatism (mm), and distortion (%) of the imaging lens in the Embodiment 1. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 2 suggests, aberrations are properly corrected.

The total track length TTL is as short as 2.74 mm, indicating that the imaging lens is thin enough though it is composed of four lenses. In addition, its F-value of 2.4 assures brightness and the half angle of view is relatively wide at about 38.8 degrees.

Embodiment 2

The basic lens data of Embodiment 2 is shown below in Table 2.

TABLE 2

Embodiment 2
Unit mm f = 2.167
Fno = 2.38
ω(°) = 38.88
IH = 1.75

Surface Data

| Surface No. i | Curvature Redius r | Surface distance d | Refractive Index Nd | Abbe No. vd |
|---|---|---|---|---|
| (Object Surface) | Infinity | Infinity | | |
| 1* (Stop) | 0.989 | 0.456 | 1.5346 | 56.16 |
| 2* (DOE) | 5.512 | 0.246 | | |
| 3* | −1.061 | 0.280 | 1.5346 | 56.16 |
| 4* | −0.774 | 0.101 | | |
| 5* | −0.612 | 0.314 | 1.6142 | 25.58 |
| 6* | −0.664 | 0.020 | | |
| 7* | 1.855 | 0.404 | 1.5346 | 56.16 |
| 8* | 0.776 | 0.107 | | |
| 9* | Infinity | 0.300 | 1.5168 | 64.20 |
| 10* | Infinity | 0.600 | | |
| Image plane | Infinity | | | |

Single lens data

| Lens | Start plane | Focal Length |
|---|---|---|
| 1 | 1 | 1.992 |
| 2 | 3 | 3.985 |
| 3 | 5 | 9.664 |
| 4 | 7 | −2.859 |

Aspheric data

|  | 1st Surface | 2nd Surface | 3rd Surface | 4th Surface |
|---|---|---|---|---|
| k | −1.184E+01 | −2.445E+01 | −6.039E−01 | 1.877E−01 |
| A4 | 1.447E+00 | −5.997E−01 | −1.510E+00 | −7.187E−01 |
| A6 | −6.013E+00 | 1.261E+00 | −1.537E+00 | 5.469E+00 |
| A8 | 1.935E+01 | −1.316E+01 | 1.962E+01 | −1.326E+00 |
| A10 | −3.308E+01 | 1.709E+01 | −2.490E+01 | −3.528E+00 |
| A12 | 0.000E+00 | 0.000E+00 | 0.000E+00 | 1.116E+01 |
| A14 | 0.000E+00 | 0.000E+00 | 0.000E+00 | 0.000E+00 |
| A16 | 0.000E+00 | 0.000E+00 | 0.000E+00 | 0.000E+00 |

|  | 5th Surface | 6th Surface | 7th Surface | 8th Surface |
|---|---|---|---|---|
| k | −1.147E+00 | −2.982E+00 | 0.000E+00 | −8.684E+00 |
| A4 | 1.049E+00 | 4.699E−01 | −8.578E−01 | −3.889E−01 |
| A6 | 2.045E+00 | −6.013E−01 | 7.406E−01 | 3.957E−01 |
| A8 | −3.743E+00 | 1.259E+00 | −2.569E−01 | −4.142E−01 |
| A10 | −2.989E+01 | −9.095E−01 | 7.335E−02 | 3.217E−01 |
| A12 | 1.156E+02 | −1.258E+00 | −6.093E−02 | −1.673E−01 |
| A14 | −1.624E+02 | 2.040E+00 | 1.971E−02 | 4.694E−02 |
| A16 | 8.212E+01 | −8.016E−01 | 3.873E−04 | −4.928E−03 |

Coefficient of optical path difference function

| B1 | −2.468E−02 |
| B2 | 1.841E−01 |
| B3 | −2.498E+00 |
| B4 | 1.881E+01 |
| B5 | −7.993E+01 |
| B6 | 1.843E+02 |
| B7 | −1.790E+02 |

As shown in Table 7, the imaging lens in the Embodiment 2 satisfies all the conditional expressions (1) to (9).

Figure 4:
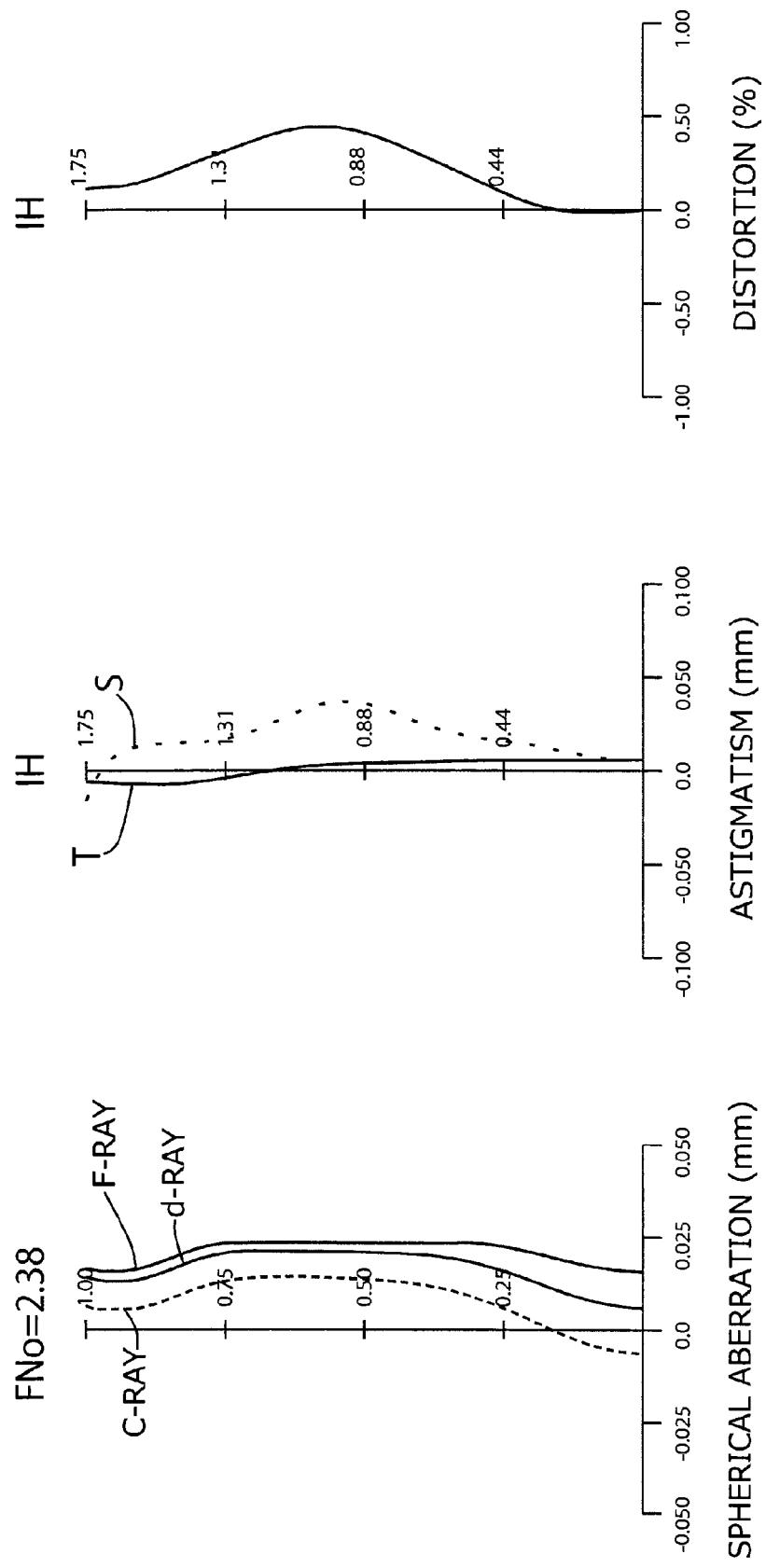
FIG. 4 shows spherical aberration, astigmatism and distortion of the imaging lens according to the Embodiment 2.
Figure 5:
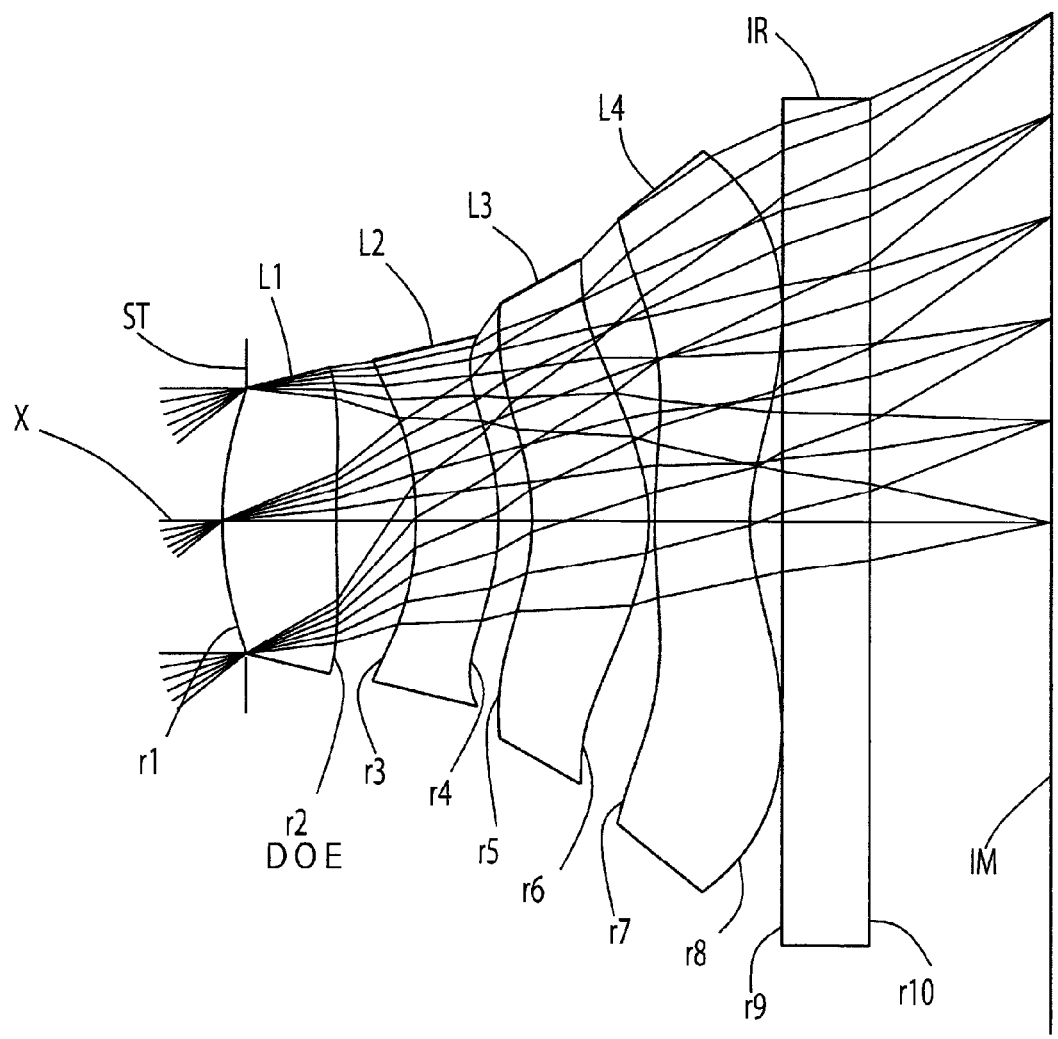
FIG. 5 is a view showing the general configuration of an imaging lens according to Embodiment 3 of the invention.

FIG. 4 shows spherical aberration (mm), astigmatism (mm), and distortion (%) of the imaging lens in the Embodiment 2. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 4 suggests, aberrations are properly corrected.

The total track length TTL is as short as 2.74 mm, indicating that the imaging lens is thin enough though it is composed of four lenses. In addition, its F-value of 2.38 assures brightness and the half angle of view is relatively wide at about 38.9 degrees.

Embodiment 3

The basic lens data of Embodiment 3 is shown below in Table 3.

TABLE 3

Embodiment 3
Unit mm f = 2.197
Fno = 2.41
ω(°) = 38.58
IH = 1.75

Surface Data

| Surface No. i | Curvature Redius r | Surface distance d | Refractive Index Nd | Abbe No. vd |
|---|---|---|---|---|
| (Object Surface) | Infinity | Infinity | | |
| 1* (Stop) | 1.195 | 0.393 | 1.6142 | 25.58 |
| 2* (DOE) | 7.206 | 0.273 | | |
| 3* | −1.192 | 0.284 | 1.5346 | 56.16 |
| 4* | −0.967 | 0.115 | | |
| 5* | −0.808 | 0.404 | 1.5346 | 56.16 |
| 6* | −0.638 | 0.021 | | |
| 7* | 2.261 | 0.327 | 1.5346 | 56.16 |
| 8* | 0.693 | 0.200 | | |
| 9* | Infinity | 0.300 | 1.5168 | 64.20 |
| 10* | Infinity | 0.538 | | |
| Image plane | Infinity | | | |

Single lens data

| Lens | Start plane | Focal Length |
|---|---|---|
| 1 | 1 | 2.000 |
| 2 | 3 | 6.624 |
| 3 | 5 | 3.084 |
| 4 | 7 | −2.009 |

Aspheric data

| | 1st Surface | 2nd Surface | 3rd Surface | 4th Surface |
|---|---|---|---|---|
| k | −3.294E+00 | −9.196E+01 | −7.717E−01 | −8.775E−02 |
| A4 | 1.637E−01 | −3.026E−01 | −8.903E−01 | −8.448E−02 |
| A6 | −7.110E−01 | −1.098E+00 | 8.907E−01 | 2.410E+00 |
| A8 | 1.836E+00 | 1.236E+00 | 9.771E+00 | 4.711E+00 |
| A10 | −6.696E+00 | −2.260E+00 | −1.853E+01 | −1.195E+01 |
| A12 | 0.000E+00 | 0.000E+00 | 0.000E+00 | 4.572E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −1.036E+00 | −4.803E+00 | 0.000E+00 | −8.166E+00 |
| A4 | 8.928E−01 | −1.784E−01 | −7.974E−01 | −4.300E−01 |
| A6 | −3.769E−01 | 8.872E−01 | 5.831E−01 | 4.431E−01 |
| A8 | 5.783E+00 | −1.775E+00 | −2.643E−01 | −4.713E−01 |
| A10 | −3.409E+01 | 1.773E+00 | 1.526E−01 | 3.788E−01 |
| A12 | 8.893E+01 | 2.783E+00 | 7.531E−02 | −2.069E−01 |
| A14 | −1.149E+02 | −6.639E+00 | −1.308E−01 | 6.192E−02 |
| A16 | 5.905E+01 | 3.306E+00 | 2.834E−02 | −7.671E−03 |

Coefficient of optical path difference function

| B1 | −3.072E−02 |
|---|---|
| B2 | −2.894E−02 |
| B3 | 1.616E−01 |
| B4 | −1.314E−01 |
| B5 | −4.373E+00 |
| B6 | 2.322E+01 |
| B7 | −3.691E+01 |

As shown in Table 7, the imaging lens in the Embodiment 3 satisfies all the conditional expressions (1) to (9).

Figure 6:
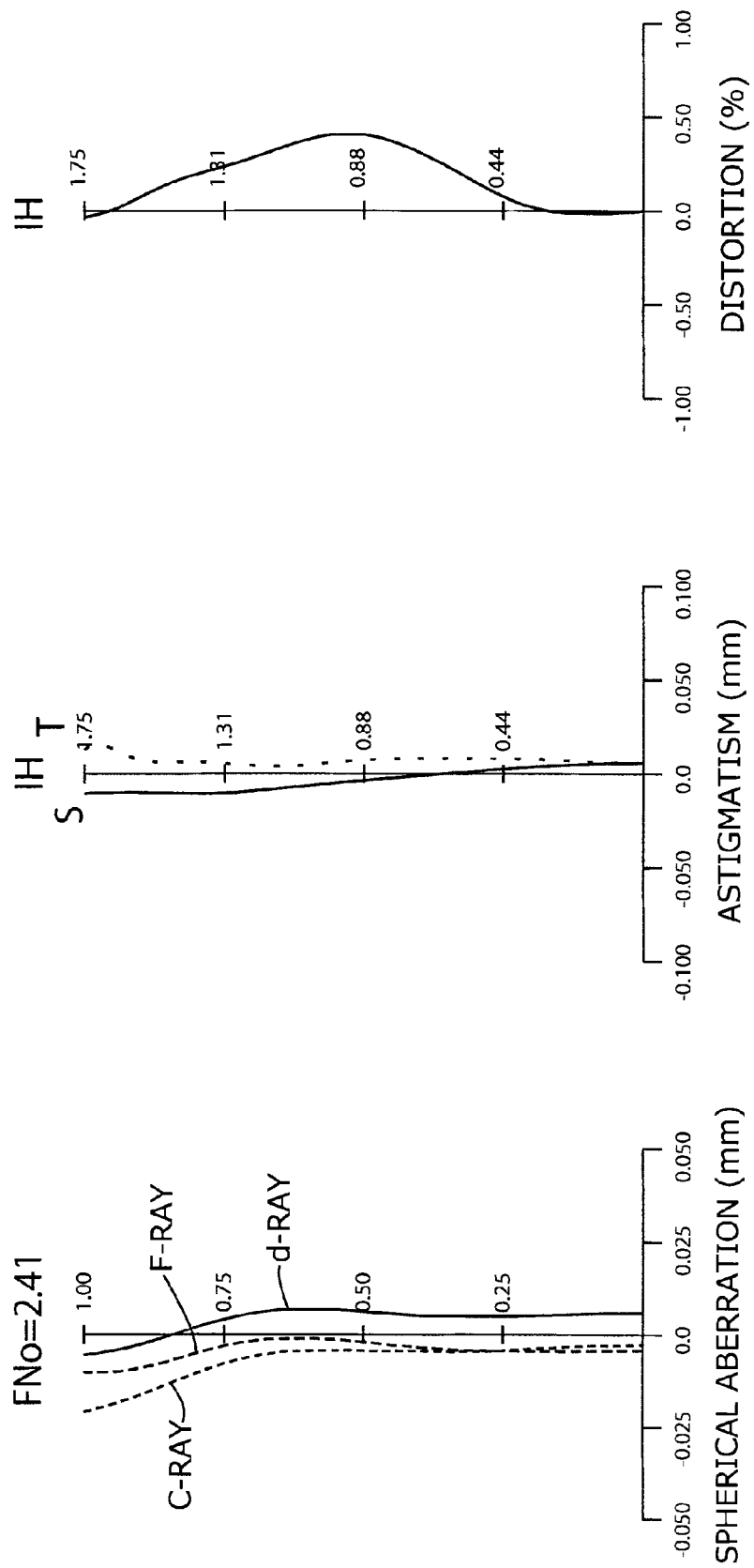
FIG. 6 shows spherical aberration, astigmatism and distortion of the imaging lens according to the Embodiment 3.
Figure 7:
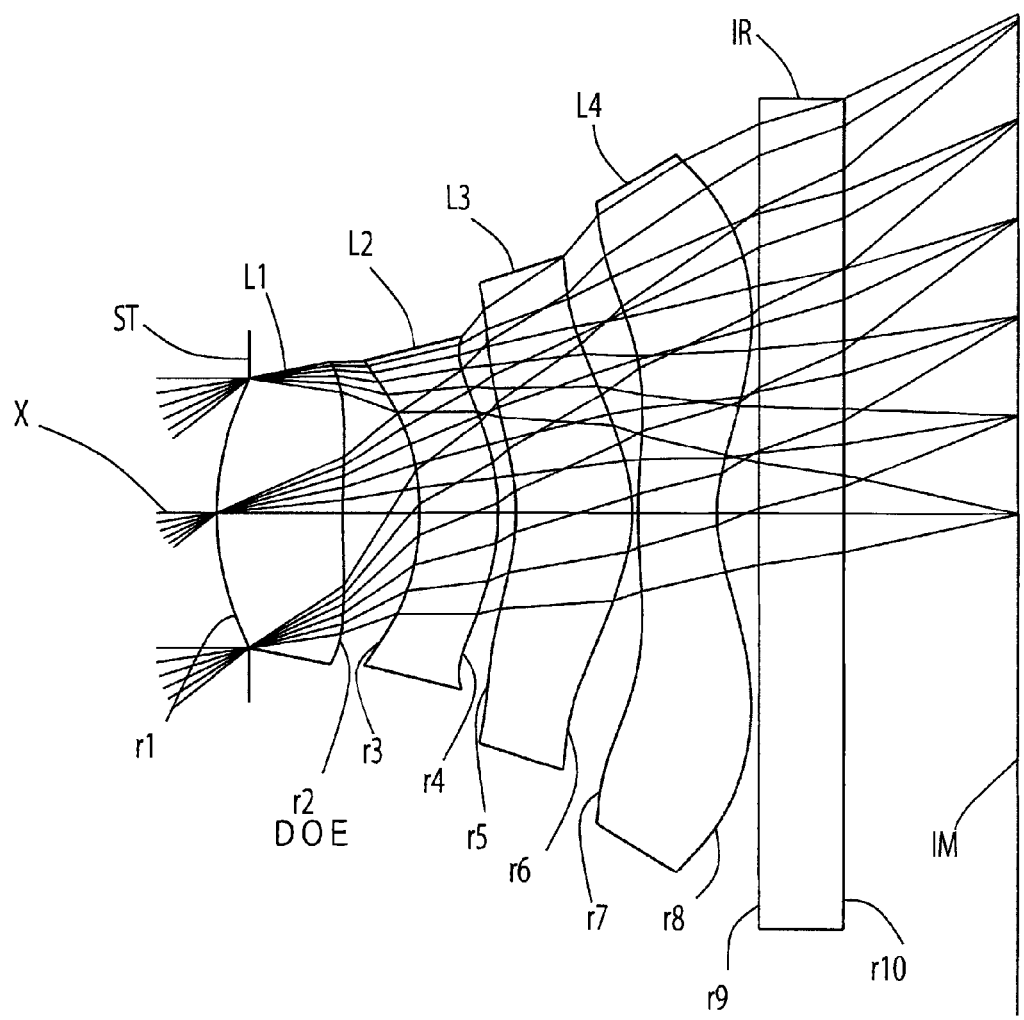
FIG. 7 is a view showing the general configuration of an imaging lens according to Embodiment 4 of the invention.

FIG. 6 shows spherical aberration (mm), astigmatism (mm), and distortion (%) of the imaging lens in the Embodiment 3. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 6 suggests, aberrations are properly corrected.

The total track length TTL is as short as 2.75 mm, indicating that the imaging lens is thin enough though it is composed of four lenses. In addition, its F-value of 2.41 assures brightness and the half angle of view is relatively wide at about 38.6 degrees.

Embodiment 4

The basic lens data of Embodiment 4 is shown below in Table 4.

TABLE 4

Embodiment 4
Unit mm f = 2.241
Fno = 2.31
ω(°) = 38.37
IH = 1.75

Surface Data

| Surface No. i | Curvature Redius r | Surface distance d | Refractive Index Nd | Abbe No. vd |
|---|---|---|---|---|
| (Object Surface) | Infinity | Infinity | | |
| 1* (Stop) | 0.992 | 0.448 | 1.5346 | 56.16 |
| 2* (DOE) | 5.322 | 0.272 | | |
| 3* | −1.003 | 0.280 | 1.6142 | 25.58 |
| 4* | −0.809 | 0.063 | | |
| 5* | −0.764 | 0.415 | 1.5346 | 56.16 |
| 6* | −0.560 | 0.020 | | |
| 7* | 2.036 | 0.280 | 1.5346 | 56.16 |
| 8* | 0.536 | 0.150 | | |
| 9* | Infinity | 0.300 | 1.5168 | 64.20 |
| 10* | Infinity | 0.607 | | |
| Image plane | Infinity | | | |

Single lens data

| Lens | Start plane | Focal Length |
|---|---|---|
| 1 | 1 | 1.961 |
| 2 | 3 | 4.358 |
| 3 | 5 | 2.289 |
| 4 | 7 | −1.450 |

Aspheric data

| | 1st Surface | 2nd Surface | 3rd Surface | 4th Surface |
|---|---|---|---|---|
| k | −2.855E+00 | −8.918E+01 | 1.431E+00 | 2.400E−01 |
| A4 | 3.766E−01 | −7.239E−01 | −7.851E−01 | 5.170E−01 |
| A6 | −1.146E+00 | 2.211E+00 | −5.390E−01 | −2.273E−01 |
| A8 | 4.772E+00 | −1.419E+01 | 1.389E+01 | 7.138E+00 |
| A10 | −1.319E+01 | 1.845E+01 | −1.308E+01 | −6.749E+00 |
| A12 | 0.000E+00 | 0.000E+00 | 0.000E+00 | 5.836E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −4.350E+00 | −5.097E+00 | 0.000E+00 | −7.203E+00 |
| A4 | 1.100E+00 | 6.482E−02 | −1.093E+00 | −5.667E−01 |
| A6 | −3.277E+00 | −4.437E−01 | 8.970E−01 | 6.772E−01 |
| A8 | 1.171E+01 | 1.214E+00 | −2.797E−01 | −6.964E−01 |
| A10 | −3.667E+01 | −4.502E−01 | 1.935E−01 | 4.959E−01 |
| A12 | 7.500E+01 | 5.473E−01 | −1.037E−02 | −2.143E−01 |
| A14 | −8.643E+01 | −2.153E+00 | −1.985E−01 | 3.820E−02 |
| A16 | 4.144E+01 | 1.340E+00 | 9.265E−02 | 1.011E−03 |

Coefficient of optical path difference function

| B1 | −2.999E−02 |
|---|---|
| B2 | 2.671E−01 |
| B3 | −2.202E+00 |

TABLE 4-continued

Embodiment 4
Unit mm

| | |
|---|---:|
| B4 | 1.110E+01 |
| B5 | -3.188E+01 |
| B6 | 5.813E+01 |
| B7 | -5.821E+01 |

As shown in Table 7, the imaging lens in the Embodiment 4 satisfies all the conditional expressions (1) to (9).

Figure 8:
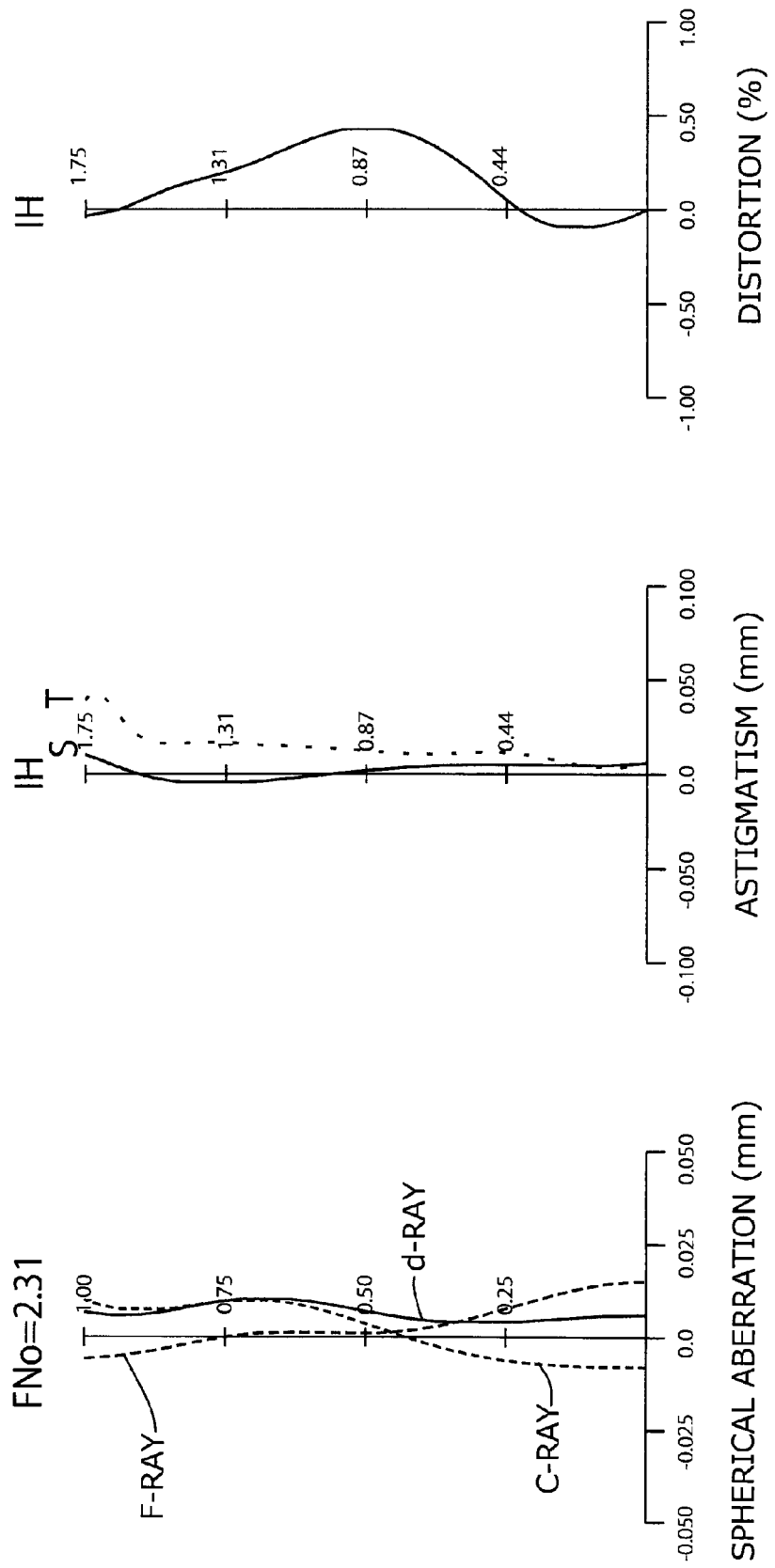
FIG. 8 shows spherical aberration, astigmatism and distortion of the imaging lens according to the Embodiment 4.
Figure 9:
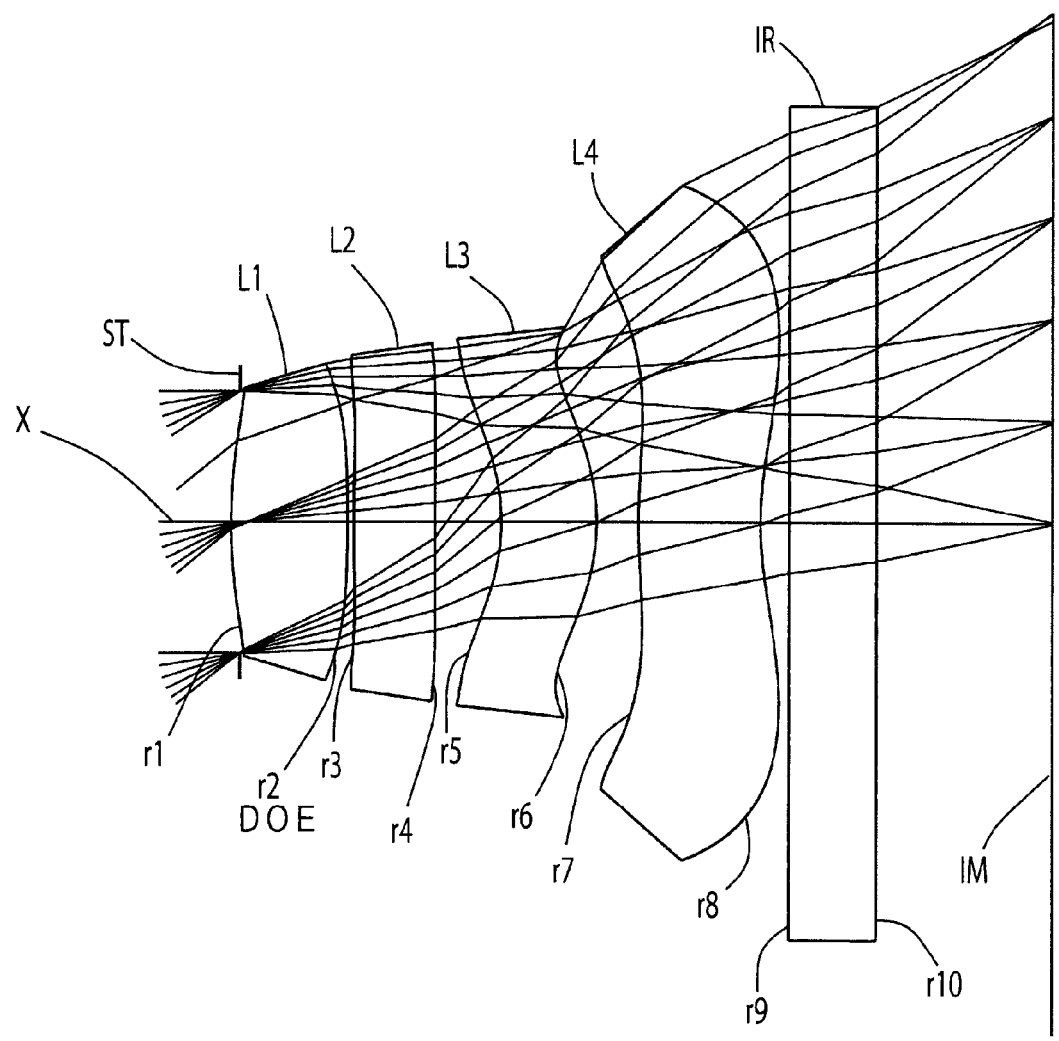
FIG. 9 is a view showing the general configuration of an imaging lens according to Embodiment 5 of the invention.

FIG. 8 shows spherical aberration (mm), astigmatism (mm), and distortion (%) of the imaging lens in the Embodiment 4. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 8 suggests, aberrations are properly corrected.

The total track length TTL is as short as 2.74 mm, indicating that the imaging lens is thin enough though it is composed of four lenses. In addition, its F-value of 2.31 assures brightness and the half angle of view is relatively wide at about 38.4 degrees.

Embodiment 5

The basic lens data of Embodiment 5 is shown below in Table 5.

TABLE 5

Embodiment 5
Unit mm $f = 2.195$
$Fno = 2.40$
$\omega(°) = 38.60$
$IH = 1.75$

Surface Data

| Surface No. i | Curvature Redius r | Surface distance d | Refractive Index Nd | Abbe No. vd |
|---|---:|---:|---:|---:|
| (Object Surface) | Infinity | Infinity | | |
| Stop | Infinity | -0.03 | | |
| 1* | 1.807 | 0.401 | 1.6142 | 25.58 |
| 2* (DOE) | -13.933 | 0.022 | | |
| 3* | 11.000 | 0.280 | 1.5346 | 56.16 |
| 4* | -428.412 | 0.229 | | |
| 5* | -0.710 | 0.329 | 1.5346 | 56.16 |
| 6* | -0.752 | 0.146 | | |
| 7* | 2.392 | 0.420 | 1.5346 | 56.16 |
| 8* | 1.187 | 0.100 | | |
| 9* | Infinity | 0.300 | 1.5168 | 64.20 |
| 10* | Infinity | 0.610 | | |
| Image plane | Infinity | | | |

Single lens data

| Lens | Start plane | Focal Length |
|---|---|---:|
| 1 | 1 | 2.000 |
| 2 | 3 | 20.000 |
| 3 | 5 | 13.576 |
| 4 | 7 | -5.006 |

Aspheric data

| | 1st Surface | 2nd Surface | 3rd Surface | 4th Surface |
|---|---:|---:|---:|---:|
| k | -1.240E+01 | 9.800E+01 | 3.460E+01 | -9.900E+01 |
| A4 | 1.149E-01 | -1.213E+00 | 1.055E-01 | 2.131E-01 |
| A6 | -1.495E+00 | 3.795E+00 | -4.176E+00 | -1.885E+00 |

TABLE 5-continued

Embodiment 5
Unit mm

| | | | | |
|---|---:|---:|---:|---:|
| A8 | 3.099E+00 | -1.321E+01 | 1.165E+01 | 5.094E+00 |
| A10 | -7.216E+00 | 1.921E+01 | -5.908E+00 | -7.469E+00 |
| A12 | 0.000E+00 | 0.000E+00 | 0.000E+00 | 4.826E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---:|---:|---:|---:|
| k | -6.909E-01 | -2.760E+00 | 0.000E+00 | -9.373E+00 |
| A4 | 6.384E-01 | -3.663E-01 | -1.005E+00 | -4.562E-01 |
| A6 | -2.243E+00 | 1.705E+00 | 1.096E+00 | 4.507E-01 |
| A8 | 2.810E+01 | 2.009E+00 | -9.708E-02 | -4.970E-01 |
| A10 | -7.625E+01 | 2.748E+00 | -1.505E+00 | 5.699E-01 |
| A12 | 2.501E+01 | -1.204E+01 | -4.383E-01 | -6.683E-01 |
| A14 | 1.888E+02 | 3.390E+00 | 3.993E+00 | 4.601E-01 |
| A16 | -2.492E+02 | -1.839E+00 | -2.422E+00 | -1.320E-01 |

Coefficient of optical path difference function

| | |
|---|---:|
| B1 | -5.990E-02 |
| B2 | 5.743E-01 |
| B3 | -4.600E+00 |
| B4 | 1.632E+01 |
| B5 | -2.295E+01 |
| B6 | 5.230E+00 |
| B7 | 1.876E+00 |

As shown in Table 7, the imaging lens in the Embodiment 5 satisfies all the conditional expressions (1) to (9).

Figure 10:
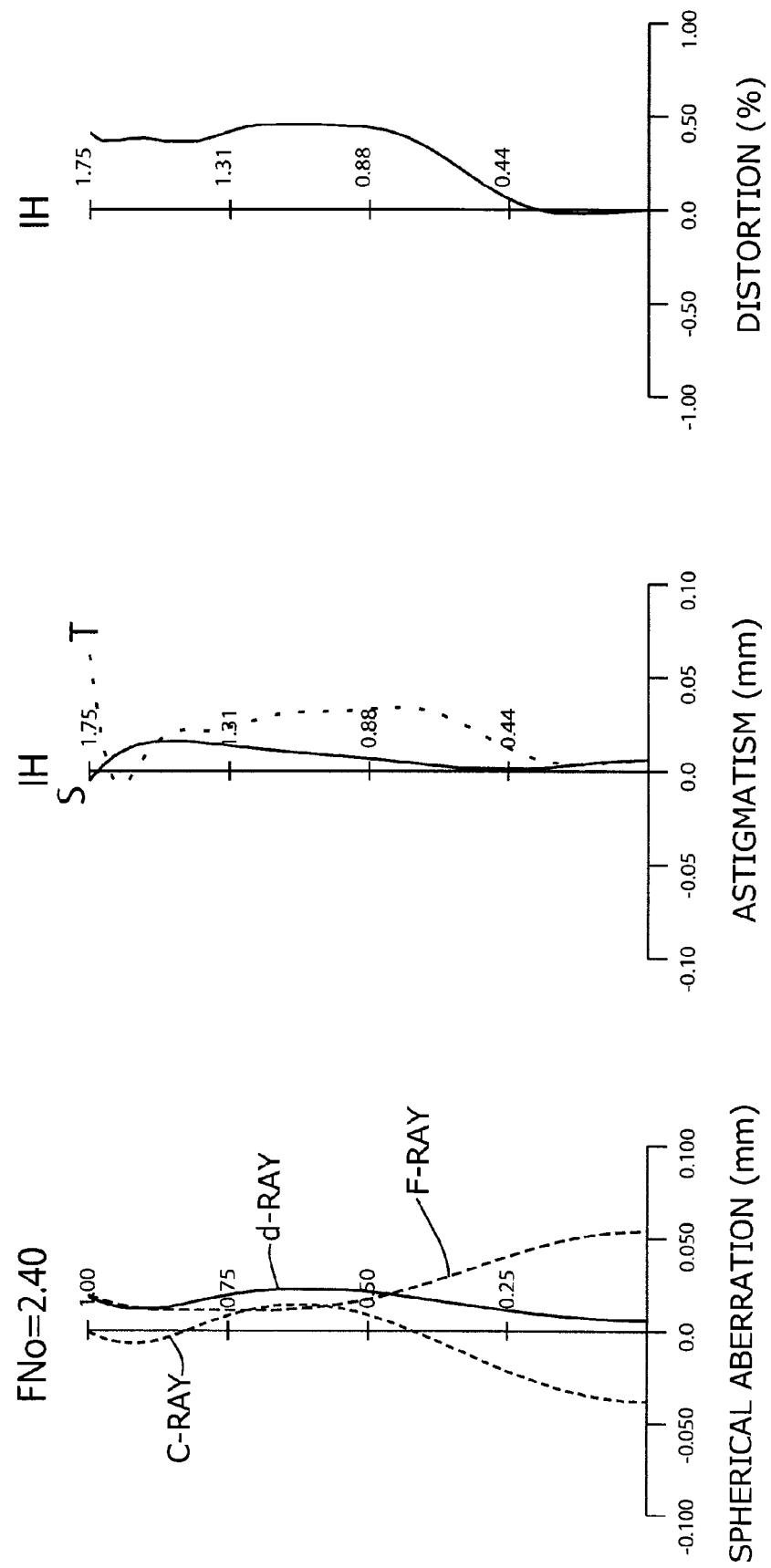
FIG. 10 shows spherical aberration, astigmatism and distortion of the imaging lens according to the Embodiment 5.
Figure 11:
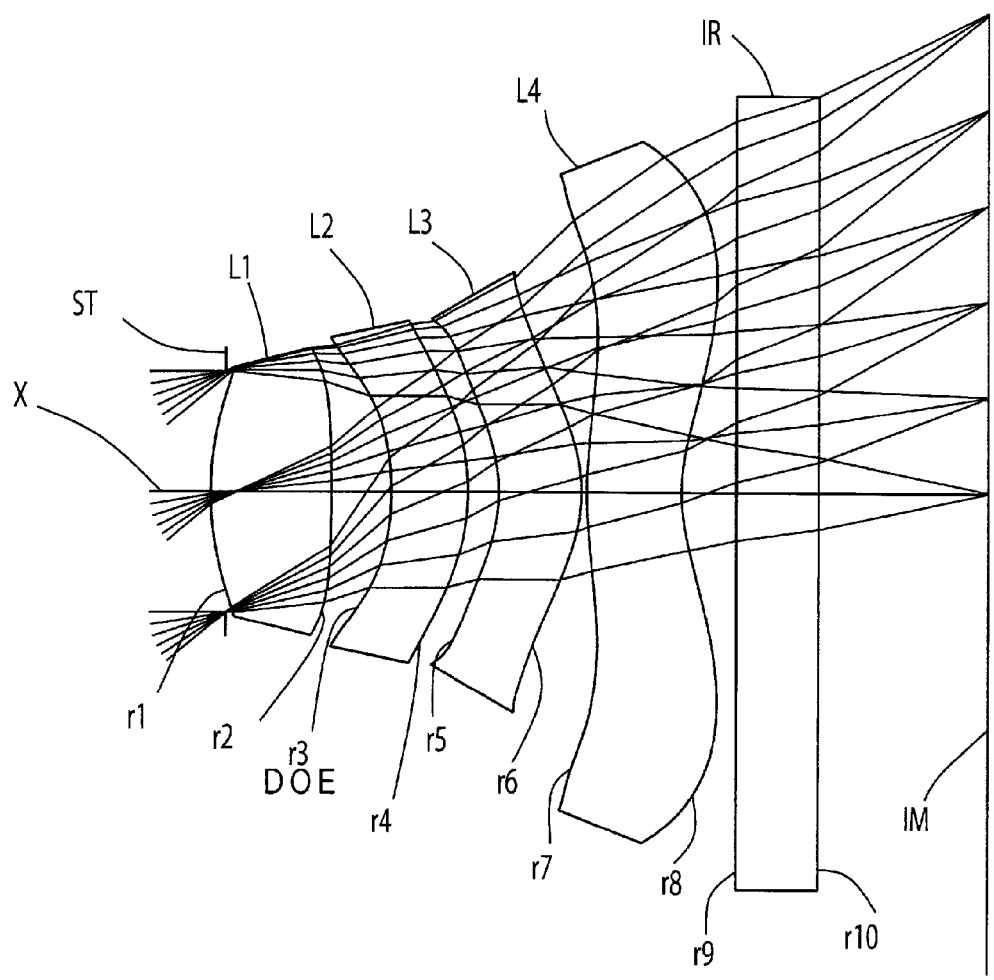
FIG. 11 is a view showing the general configuration of an imaging lens according to Embodiment 6 of the invention.

FIG. 10 shows spherical aberration (mm), astigmatism (mm), and distortion (%) of the imaging lens in the Embodiment 5. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 10 suggests, aberrations are properly corrected.

The total track length TTL is as short as 2.75 mm, indicating that the imaging lens is thin enough though it is composed of four lenses. In addition, its F-value of 2.40 assures brightness and the half angle of view is relatively wide at about 38.6 degrees.

Embodiment 6

The basic lens data of Embodiment 6 is shown below in Table 6.

TABLE 6

Embodiment 6
Unit mm $f = 2.113$
$Fno = 2.40$
$\omega(°) = 39.58$
$IH = 1.75$

Surface Data

| Surface No. i | Curvature Redius r | Surface distance d | Refractive Index Nd | Abbe No. vd |
|---|---:|---:|---:|---:|
| (Object Surface) | Infinity | Infinity | | |
| Stop | Infinity | -0.055 | | |
| 1* | 1.134 | 0.441 | 1.5346 | 56.16 |
| 2* | -17.151 | 0.222 | | |
| 3* (DOE) | -0.944 | 0.280 | 1.5346 | 56.16 |
| 4* | -0.853 | 0.113 | | |
| 5* | -0.599 | 0.304 | 1.6142 | 25.58 |
| 6* | -0.574 | 0.020 | | |

TABLE 6-continued

Embodiment 6
Unit mm

| | | | | |
|---|---|---|---|---|
| 7* | 1.639 | 0.349 | 1.5346 | 56.16 |
| 8* | 0.677 | 0.200 | | |
| 9* | Infinity | 0.300 | 1.5168 | 64.20 |
| 10* | Infinity | 0.611 | | |
| Image plane | Infinity | | | |

Single lens data

| Lens | Start plane | Focal Length |
|---|---|---|
| 1 | 1 | 2.000 |
| 2 | 3 | 5.440 |
| 3 | 5 | 3.932 |
| 4 | 7 | −2.463 |

Aspheric data

| | 1st Surface | 2nd Surface | 3rd Surface | 4th Surface |
|---|---|---|---|---|
| k | −1.127E+01 | −1.358E+01 | −5.897E+00 | 1.262E−01 |
| A4 | 9.241E−01 | −5.180E−01 | −1.505E+00 | −7.214E−01 |
| A6 | −4.255E+00 | −9.657E−01 | −3.428E+00 | 5.540E+00 |
| A8 | 1.436E+01 | −3.196E+00 | 2.451E+01 | −5.334E+00 |
| A10 | −3.012E+01 | 7.231E+00 | −2.600E+01 | −1.161E+01 |
| A12 | 0.000E+00 | 0.000E+00 | 0.000E+00 | 2.060E+01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −8.513E−01 | −2.609E+00 | 0.000E+00 | −7.799E+00 |
| A4 | 7.979E−01 | 2.843E−01 | −8.067E−01 | −3.863E−01 |
| A6 | 4.016E+00 | 2.023E−01 | 8.322E−01 | 4.540E−01 |
| A8 | −8.466E+00 | 9.007E−01 | −5.771E−01 | −4.958E−01 |
| A10 | −3.742E+01 | −3.567E+00 | 4.884E−02 | 3.441E−01 |
| A12 | 1.366E+02 | −1.262E+00 | 5.761E−02 | −1.560E−01 |
| A14 | −1.198E+02 | 9.385E+00 | 1.329E−01 | 4.194E−02 |
| A16 | −7.825E+01 | −5.151E+00 | −8.137E−02 | −5.928E−03 |

Coefficient of optical path difference function

| | |
|---|---|
| B1 | −3.064E−02 |
| B2 | 4.299E−01 |
| B3 | −5.331E+00 |
| B4 | 3.281E+01 |
| B5 | −1.106E+02 |
| B6 | 2.115E+02 |
| B7 | −1.882E+02 |

As shown in Table 7, the imaging lens in the Embodiment 6 satisfies all the conditional expressions (1) to (9).

FIG. 12 shows spherical aberration (mm), astigmatism (mm), and distortion (%) of the imaging lens in the Embodiment 6. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T. As FIG. 12 suggests, aberrations are properly corrected.

The total track length TTL is as short as 2.74 mm, indicating that the imaging lens is thin enough though it is composed of four lenses. In addition, its F-value of 2.40 assures brightness and the half angle of view is relatively wide at about 39.6 degrees.

As can be understood from the above explanation, according to the aforementioned embodiments of the present invention, though the imaging lens is composed of four lenses, it provides both a capability to correct chromatic aberration and achieves a very short total track length TTL by appropriately using the chromatic aberration correction function of the diffractive optical surface DOE without using a negative lens. All the lens surfaces have appropriate aspheric shapes so as to correct various aberrations properly and the F-value of about 2.40 assures brightness so that it can be applied to the latest type of image sensor with a high pixel density. In addition, the half angle of view co is as wide as 38 degrees or more so that an image of a wide object can be taken.

Table 7 shows data on the Embodiments 1 to 6 relating to the conditional expressions (1) to (9).

TABLE 7

Value of conditional expressions

| | | Embodiment 1 | Embodiment 2 | Embodiment 3 | Embodiment 4 | Embodiment 5 | Embodiment 6 |
|---|---|---|---|---|---|---|---|
| (1) 1.58 < Ndi | | 1.6142(L1) | 1.6142(L3) | 1.6142(L1) | 1.6142(L2) | 1.6142(L1) | 1.6142(L2) |
| (2) 0.7 < TTL/(2IH) < 0.9 | | 0.782 | 0.782 | 0.787 | 0.782 | 0.787 | 0.784 |
| (3) 0.7 < f1/f < 1.1 | | 0.912 | 0.919 | 0.910 | 0.875 | 0.911 | 0.947 |
| (4) 0.40 < r1/f < 1.0 | | 0.551 | 0.456 | 0.544 | 0.443 | 0.823 | 0.537 |
| (5) 0.6 < f123/f < 0.9 | | 0.726 | 0.726 | 0.706 | 0.609 | 0.890 | 0.748 |
| (6) 0.6 < Σd/TTL < 0.8 | | 0.666 | 0.665 | 0.660 | 0.650 | 0.664 | 0.630 |
| (7) 0.02 < T12/Σd < 0.20 | | 0.146 | 0.135 | 0.150 | 0.153 | 0.012 | 0.128 |
| (8) 0.6 < Tie/Ti < 1.3 | L1 | 0.718 | 0.665 | 0.727 | 0.643 | 0.741 | 0.636 |
| | L2 | 1.252 | 1.192 | 1.000 | 1.238 | 0.988 | 1.021 |
| | L3 | 0.682 | 0.852 | 0.696 | 0.649 | 0.996 | 0.997 |
| | L4 | 1.048 | 0.693 | 0.961 | 1.011 | 0.667 | 0.871 |
| (9) 1 ≤ Dn ≤ 20 | | 18 | 8 | 17 | 4 | 18 | 9 |

As explained so far, when the imaging lens composed of four lenses according to any of the aforementioned embodiments is used for an optical system built in a mobile terminal such as a mobile phone or smart phone, PDA (Personal Digital Assistance) or image pickup device mounted in a game machine or the like, it is possible to provide a high performance camera function and realize an image pickup device which is thin enough.

According to the present invention, it is possible to provide an imaging lens which meets the need for compactness and thinness and corrects various aberrations properly and provides a relatively wide angle of view and sufficient brightness.

Also, since all the constituent lenses are made of plastic material, the imaging lens is suitable for mass production and can be produced at low cost.

What is claimed is:

1. An imaging lens for a solid-state image sensor in which lenses are arranged in order from an object side to an image side, comprising:
    an aperture stop;
    a first lens as a meniscus lens with positive refractive power having a convex surface on the object side near an optical axis;
    a second lens as a meniscus lens with positive refractive power having a convex surface on the image side near the optical axis;
    a third lens as a meniscus lens with positive refractive power having a convex surface on the image side near the optical axis; and
    a fourth lens as a meniscus lens with negative refractive power having a concave surface on the image side near the optical axis,
    wherein all lens surfaces are aspheric;
    wherein all the lenses are made of plastic material;
    wherein a diffractive optical surface is formed on at least one of lens surfaces from an image-side surface of the first lens to an image-side surface of the second lens;
    wherein at least one of the three lenses with positive refractive power satisfies a conditional expression (1) below:

$$1.58 < Ndi \quad (1)$$

where
Ndi: refractive index of the at least one of the three positive lenses at d-ray;
wherein a conditional expression (2) below is satisfied:

$$0.7 < TTL/(2IH) < 0.9 \quad (2)$$

where
TTL: distance on the optical axis from the object-side surface of the first lens to an image plane (a total track length), and
IH: maximum image height;
wherein a conditional expression (3) below is satisfied:

$$0.7 < f1/f < 1.1 \quad (3)$$

where
f1: focal length of the first lens, and
f: focal length of an overall optical system and
wherein an F-value of the imaging lens falls in the range from 2.31 to 2.41.

2. The imaging lens according to claim 1, wherein a conditional expression (4) below is satisfied:

$$0.40 < r1/f < 1.0 \quad (4)$$

where
r1: curvature radius of the object-side surface of the first lens, and
f: focal length of the overall optical system.

3. The imaging lens according to claim 1, wherein a conditional expression (5) below is satisfied:

$$0.6 < f123/f < 0.9 \quad (5)$$

where
f123: composite focal length of the first, second, and third lenses, and
f: focal length of an overall optical system.

4. The imaging lens according to claim 1, wherein the object-side surface and image-side surface of the fourth lens have a pole-change point off the optical axis.

5. The imaging lens according to claim 1, wherein a conditional expression (6) below is satisfied:

$$0.6 < \Sigma d/TTL < 0.8 \quad (6)$$

where
$\Sigma d$: distance on the optical axis from the object-side surface of the first lens to the image-side surface of the fourth lens, and
TTL: distance on the optical axis from the object-side surface of the first lens to the image plane (a total track length).

6. The imaging lens according to claim 1, wherein a conditional expression (7) below is satisfied:

$$0.02 < T12/\Sigma d < 0.20 \quad (7)$$

where
T12: distance on the optical axis from the image-side surface of the first lens to the object-side surface of the second lens, and
$\Sigma d$: distance on the optical axis from the object-side surface of the first lens to the image-side surface of the fourth lens.

7. The imaging lens according to claim 1, wherein the first lens, the second lens, the third lens, and the fourth lens satisfy a conditional expression (8) below:

$$0.6 < Tie/Ti < 1.3 \quad (8)$$

where
Ti: center thickness of an i-th lens, and
Tie: edge thickness of the i-th lens.

8. The imaging lens according to claim 1, wherein a conditional expression (9) below is satisfied:

$$1 \le Dn \le 20$$

where
Dn: a number of a diffraction grating of the diffractive optical surface (integer).

* * * * *